United States Patent

[11] 3,614,310

[72] Inventor Adrianus Korpel
Prospect Heights, Ill.

[21] Appl. No. 15,540
[22] Filed Mar. 2, 1970
[45] Patented Oct. 19, 1971
[73] Assignee Zenith Radio Corporation
Chicago, Ill.

[54] ELECTROOPTICAL APPARATUS EMPLOYING A HOLLOW BEAM FOR TRANSLATING AN IMAGE OF AN OBJECT
12 Claims, 13 Drawing Figs.

[52] U.S. Cl. .......... 178/6.8, 178/DIG. 25, 178/DIG. 28
[51] Int. Cl. .......... H04n 5/14, H04n 7/18
[50] Field of Search .......... 178/6.8, DIG. 34, DIG. 28, DIG. 25, 7.6

[56] References Cited
UNITED STATES PATENTS
2,962,548 11/1960 Taudt .......... 178/DIG. 34

*Primary Examiner*—Robert I. Griffin
*Assistant Examiner*—Richard K. Eckert, Jr.
*Attorney*—Francis W. Crotty ABSTRACT: A hollow beam of monochromatic light is deflected repetitively through a scanning pattern and focused upon an image plane in which is located an object desired to be scanned. A detector senses light reflected from or transmitted through the object to develop video signals that at each instant of time represent light intensity. These video signals are fed to an image reproducer that creates an image of the object in synchronization with the scanning pattern. The apparatus further includes a filter system that effects a modification of the video signals in order to restore image contrast which otherwise is seriously degraded as a consequence of utilizing a hollow light beam in order to obtain an increase in depth of field for the optical system.

The disclosure also concerns using the apparatus for video recording as well as reproducing.

Inventor
Adrianus Korpel
By Francis W. Crotty
Attorney

Inventor
Adrianus Korpel
By Francis W. Crotty
Attorney

Inventor
Adrianus Korpel
By Francis W. Crotty
Attorney

Inventor
Adrianus Korpel
By Francis W. Crotty
Attorney

ELECTROOPTICAL APPARATUS EMPLOYING A HOLLOW BEAM FOR TRANSLATING AN IMAGE OF AN OBJECT

BACKGROUND OF THE INVENTION

The present invention pertains to image recording and reproducing apparatus. More particularly, it relates to an image recording and reproducing system in which a hollow light beam is scanned across an object to record or reproduce an image.

In my application Ser. No. 658,477, filed Aug. 4, 1967, now U.S. Pat. No. 3,534,166, there is disclosed a system in which a high resolution image of an object is reproduced by means of a light beam that is caused to scan the object; the intensity of the light transmitted from the object represents a video signal. The aim in that case is to reproduce an image that has previously been recorded upon a strip of film by a light-beam scanning technique that conveniently involved use of the same apparatus. Both for recording and reproducing the image stored upon the strip, the light beam is focused onto an image plane in which the film strip is disposed. By reason of focusing the light beam during recording, the recorded image may be many times smaller than the actual or reproduced object.

Apparatus generally similar to that employed in such a recording and reproducing system has also been demonstrated for use as a microscope. In such a case, an unmodulated light beam is deflected horizontally and vertically to define an image raster which is reduced in size as it is focused upon the surface of an object to be observed. By monitoring the reflection of light from that surface, a video signal is developed and utilized for the reproduction of an image on a television receiver picture screen. Since the dimensions of the image reproduced by the television receiver may be many times greater than the corresponding dimensions of the raster formed on the object, a greatly magnified image of the object surface may be produced without, in a given system, any necessary loss of resolution. That is, the system is capable of exhibiting minute details of the surface, details which are discernible by reason of the extremely small size to which the moving spot of light is focused.

In both of these systems, the definition or detail present in the recorded or the reproduced image is a function of the size of the moving spot of light. That is, a difference in light intensity can be recorded or observed only if it occurs over a distance greater than the width of the light beam. For an analogy, assume the movement of a pencil beam of light across the surface of a checkered board located in an otherwise darkened room. When the spot of light on the board is smaller than the size of the squares, the observer sees a definite change in the brightness of the spot as it is moved from a dark square to a light square. On the other hand, when the size of the spot is increased so as to cover several squares at the same time, the brightness of the observed spot seems to remain constant as it is moved across the board because the light reflected individually from the black and white squares is averaged by the eye. Hence, to observe differences in details of an image, all portions of which are simultaneously looked at by a detector, it is necessary that the spot size be smaller than the size of the detail desired to be detected.

Both the recorder-reproducer and the microscope are capable of developing an image in very fine detail. That is, their resolution capability is high. Indeed, this is obtained by focusing the moving spot of light to an extremely small diameter, of the order of one micron. In correspondence with well-known optical principles, the focusing of the light beam into a very small spot also results in its being in focus only over a very small distance of the travel of the light. That distance over which a focused quantity of light may be said to be in focus is termed its depth of focus. When a surface upon which the light may be discerned is placed within the depth of focus, the spot appears on the surface in sharply-defined form. However, as the surface is moved to a position either toward or away from the light source over a distance greater than the depth of focus, the spot as seen on the surface becomes of very fuzzy outline; it is out of focus. Consequently, in order to obtain an image depicting sharp outlines of its different features, it is necessary that either the record strip of the recorder-reproducer or the surface of the object under study in the microscope be located accurately within the depth of focus of the focused light beam.

However, when utilizing an extremely small spot in order to achieve maximum resolution of the image details, the corresponding reduction in the depth of focus means that the strip or object must be very precisely located in the system. In practical applications, mere positional displacements of the components as a result of thermal changes or ordinary room vibration can result in lack of sharp focus of the beam upon the surface. Correspondingly, the ultimately reproduced image cannot be brought into focus so as to permit observation of the detail inherent in the use of the small spot size.

For many years, it has been generally known that an increase in the depth of focus of a focused quantity of light may be obtained by shaping the quantity of light into a hollow beam. Consequently, an immediate relaxation of the above-discussed tolerance in position of the scanned surface is available by modifying the focused beam so that it is hollow in shape. Unfortunately, however, it has been discovered that this results in a significant and undesirable loss of contrast in the image. The contrast of an image is that quality which when present means that all shades of brilliance are discernible, from the lightest to the darkest and including the intermediate "grays."

A general object of the present invention is to provide new and improved imaging apparatus of the foregoing general character in which physical tolerances may be relaxed while producing images having a high degree of contrast.

Another object of the present invention is to provide new and improved optical apparatus that simultaneously exhibits both high resolution and high contrast.

A further object of the present invention is to provide such a system and in which enhancement of contrast is obtained in a manner permitting adjustability of its relative value.

Electro-optical apparatus constructed in accordance with the present invention includes means for producing a hollow beam of substantially monochromatic light focused upon an image plane and for deflecting the beam to scan an image area in that plane. There are means responsive to the scanning of the light beam over the image area for translating an image of an object. Video signals are developed that represent the object and finally, the apparatus includes means for effectively modifying the video signals in order to compensate for contrast degradation that is attributable to scanning with a hollow beam and is related thereto as a function of the dimensions of the hollow scanning beam.

The features of the present invention which are believed to be novel are set forth with particularity in the appended claims. The organization and manner of operation of the invention, together with further objects and advantages thereof, may best be understood by reference to the following description taken in conjunction with the following drawings, in the several figures of which like reference numerals identify like elements, and in which:

Figure 1:
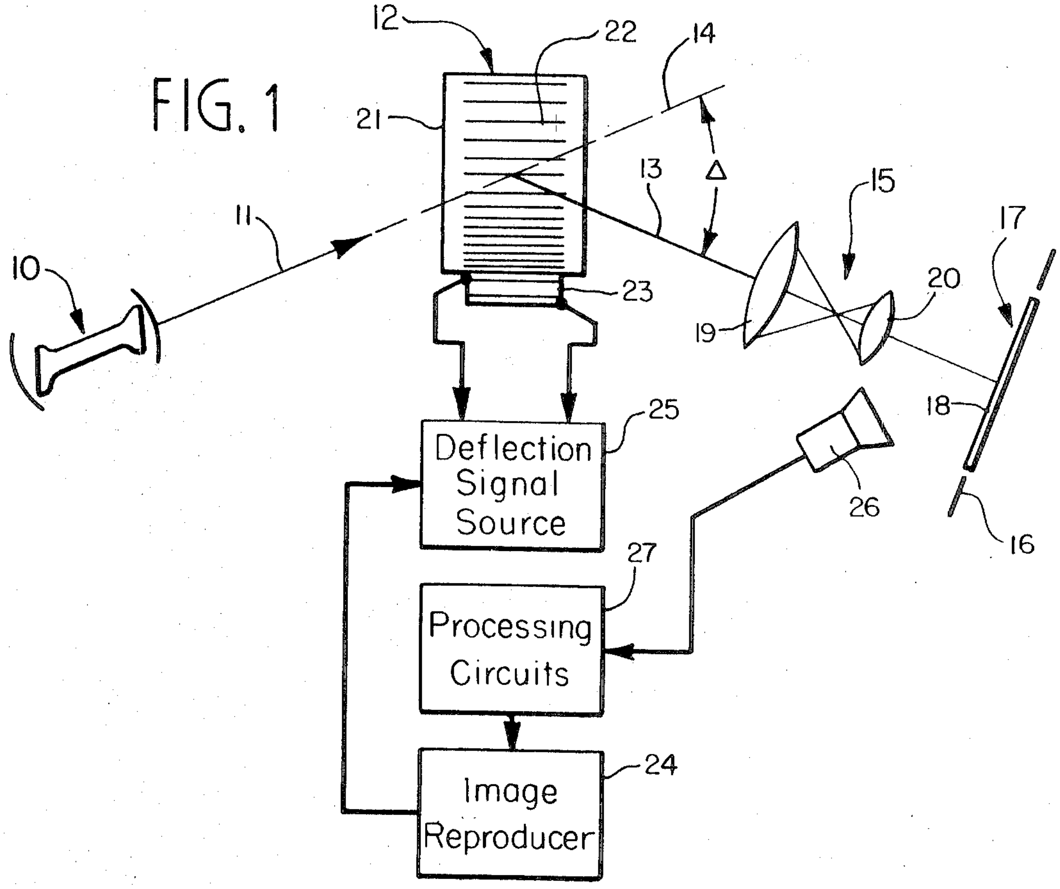
FIG. 1 is a schematic diagram, partially in block diagram form, of an image reproducing system.

The system illustrated in FIG. 1 includes a source 10 of collimated high-intensity optical radiation as exemplified by the output of a laser. The term "optical" is used here to denote that type of radiation which is capable of being acted upon, e.g., focused or magnified, by typical optical components such as lenses; included is radiation in the infrared, visible and ultraviolet regions of the spectrum. Since it is convenient for illustration to utilize visible light, the description hereafter will proceed on that basis; nevertheless, the term "light" as employed herein is defined to mean optical radiation of any appropriate wavelength.

A beam of light from laser 10 is projected along a path 11 through a deflector 12 from which a beam emerges along a path 13 formed at an angle Δ to the path 14 the light would travel when not deflected. Beyond deflector 12 on path 13 is a component 15 for focusing the light beam upon an image plane 16 in which, in this case, is disposed an object 17 a surface 18 of which is understudy. Focusing component 15 as shown is in the form of a telescope having an object lens 19 and an eyepiece 20; however, it may as well be a simple spherical lens.

Deflector 12 may take a number of known forms. For example, a mechanical approach is feasible in which mirrors are caused to rotate or scan by galvanometerlike driving elements under the control of scanning signals derived from a deflection signal source. However, the system of FIG. 1 preferably employs a light-beam deflection element of the kind described in the aforementioned prior application. Such a deflector is one which utilizes diffractive interaction between sound waves and the light beam. The angle by which the light beam is diffracted is proportional to the frequency of the sound waves, and, by repetitively scanning the sound frequency through a range of frequencies, the light beam is caused to scan back and forth a controlled amount in the plane of diffraction. Thus, as herein embodied the deflector includes a container 21 enclosing a medium such as water in which sound waves 22 are caused to propagate by a transducer 23. While the latter may be simply a flat piezoelectric crystal, the prior application discusses a more complex transducer structure that enables an increased range of scan. Also disclosed in that prior application are the use of several additional components that may be placed into beam paths 11 and 13 and other modifications that may be made upon the apparatus here described for the purpose of optimizing and improving the overall performance of the system. Accordingly, such additional components and modifications desirably are included in the present system, although their further discussion herein is unnecessary for a complete understanding of the present invention.

Further included in the system is an image reproducer 24 which in this instance is part of an entirely conventional television receiver. Reproducer 24 thus includes the usual means for developing synchronizing signals that are utilized to control the scanning of an image raster on a cathode-ray tube faceplate so as to result in the production on that faceplate of a television picture when a video signal is also supplied to the cathode-ray tube. At the same time, transducer 23 of deflector 12 is driven by a variable-frequency deflection signal source 25 which, in turn, is controlled as to frequency by and synchronized with the conventional horizontal scanning signal developed in and derived from image reproducer 24. Consequently, sound waves 22 propagating across the path of the light beam change in wavelength in correspondence with the change in the frequency of the deflection signals from source 25. In more detail, source 25 develops a high-frequency carrier signal that is frequency modulated repetitively in a cycle. That cycle is timed or controlled by the horizontal scanning signal from reproducer 24 so that the carrier frequency is repeatedly scanned over a given frequency range. Such scanning of the sound frequency produces the desired horizontal scansions of the light beam across image plane 16 in synchronism with the line-trace intervals of the picture developed by reproducer 24. Typically, the horizontal scanning signal has a repetition rate of 15,750 Hertz.

In addition to deflecting the light beam in an assumed horizontal direction, either the light beam is further deflected or object 17 is physically displaced to cause relative movement between the beam and the object in the coordinate or vertical direction. That is, assuming object 17 to be three dimensional and having a significant dimension in the direction into and out of the plane of the drawing, its uniform motion in that vertical direction, while the light beam in path 13 is caused to be repetitively scanned back and forth in the horizontal plane, causes the spot of light formed on surface 18 of the object to move along a vertically spaced succession of nearly horizontal lines. In other words, the horizontal deflection of the light beam together with the vertical movement of object 17 causes the light beam to scan an image raster upon the object surface. In an alternative arrangement, a second deflector may be included in the light beam path to cause deflection of the beam in a vertical direction in a manner analogous to the horizontal deflection by deflector 12. Such a vertical deflector similarly may take advantage of the diffractive interaction between light and sound waves. However, because the vertical scanning rate conventional to television receivers is very slow compared to the horizontal scanning rate, successfully demonstrated systems typically have employed electromechanically-moved mirrors to accomplish the vertical deflection.

In one exemplary system utilizing diffraction by sound waves in the manner of deflector 12, the sound frequency is scanned through a frequency range $\tau\Delta f$ of 19 to 35 MegaHertz. Some 200 resolvable spots are developed in the horizontal direction, the number of resolvable spots N being equal to $\tau\Delta f$, where $\tau$ in this case is the transit time of the sound past the light beam. Upon emerging from deflector 12 and being focused upon surface 18, an extremely small picture or image in the form of a line of light appears on that surface. Because of the coherence of laser light, substantially all of the light from laser 10 is concentrated into this single line and the available brightness, or the light flux per unit area on the surface, is enormous.

For a system thus utilizing 200 resolvable spots in the horizontal direction and also incorporating synchronized vertical movement of an objector strip 17 so that the successively scanned horizontal lines are disposed seriatim along the length of strip 17 with each one displaced from the next so as to define an image raster, the size of that raster in the illustrative case is only 0.020 inch by 0.015 inch. Consequently, each resolvable spot or image element has a diameter of only 0.0001 inch or 2.5 micron. It can be shown that the ultimate limit of resolution is determined by the wavelength of the optical radiation utilized. Employing the same system arrangement described with an even smaller image width, a spot size of 1 micron (one twenty-five thousandths of an inch) has been obtained with red light. It will be observed that such a small spot size is close to the theoretical limit of one-half the wavelength of the light.

In another exemplary arrangement generally according to FIG. 1, a system exhibiting 200 resolvable spots at deflector 12 produced a raster on surface 18 having a horizontal dimension or width of 1.6 millimeters and a height of 1.2 millimeters. That height is three-fourths the width in correspondence to movement of a point on surface 18 by that vertical distance in one-sixtieth of a second, the time interval of one field of a conventional television picture. As indicated, the movement of that point may be obtained either by vertically deflecting the light beam or physically moving object 17. Utilizing in place of the illustrated telescope a simple spherical lens of 18.75 centimeters focal length, a frequency sweep from source 25 of 20 MegaHertz and light from a helium-neon laser of 6,328 Angstroms wavelength, the horizontal scan angle of the beam emerging from deflector 12 is 8.5 milliradians and the spherical lens forms an image on surface 18 that is 1.6 millimeters wide. Using an even wider deflection range so as to obtain 400 resolvable spots and employing a spot size on surface 18 of 0.10 mil, the developed image has a horizontal dimension of 0.040 inch and a vertical height of but 0.030 inch. The corresponding vertical speed of relative movement between surface 18 and the light beam is then 0.9 inches per second.

As further described in the aforesaid prior application, a light modulator may be disposed in beam path 11 between laser 10 and deflector 12. Video signals fed to that modulator are then modulated upon the beam in the form of variations of its intensity. Consequently, the brightness of the spot formed on surface 18 changes as it moves along each image line in correspondence with the changes in the video modulation. Employing as object 17 a strip of photographic film and synchronizing both the horizontal and vertical deflection rates with the development of the video signals, an image of each video field may be recorded upon the strip of film, by virtue of the exposure of its photosensitive surface, in response to the varying intensity of the moving spot of light. Also preferably recorded at the same time are the associated signal information that represents the synchronizing components as well as the audio program material.

After developing the film which has been scanned by a video-modulated laser beam, the images so recorded by the system of the prior application are reproduced by disabling the light modulator but again operating the deflection arrangement so as to cause a constant intensity, focused spot of the light to be scanned in a succession of lines across the recorded image. The variations in the pictorial content of the image, as represented by different degrees of opacity in the recording medium, cause the light transmitted from the recorded image to be modified in intensity as the image is scanned. Such modification occurs in both light which is reflected backwardly from the recorded image and light that is transmitted through the film. Accordingly, a detector 26 placed so as to respond either to light reflected from the image or that transmitted through the film develops video signals that are representative of the changes in pictured content as the light beams scans the recorded image. These video signals are then fed to a television-receiver-type image reproducer where they are utilized to drive its cathode-ray tube. At the same time, the additional recorded signal information developed, as a result of also scanning the light beam across the recorded synchronizing information, is separated out in the television receiver. That information is utilized in the conventional way to control the scanning signals applied to the cathode-ray tube and thus cause it to create an image raster which is synchronized with the scanning of the light beam across the film strip.

The television picture so developed constitutes a greatly magnified re-creation of the image recorded upon the strip of film. Consequently, such a system functions as a flying-spot laser microscope to create a greatly magnified image of a very small surface area. Quite analogously, then, the so-called playback portion of the apparatus just described actually finds advantageous use as such a microscope. In that environment, the film strip is replaced by a material object of interest and its surface to be studied is located in the image plane; this is image plane 16 in FIG. 1. The video information is again developed, for example, by means of detector 26 which responds to reflected light as the constant intensity laser scans the object surface. An area of that surface having dimensions of but a fraction of an inch is thus magnified in its re-creation upon the faceplate of the cathode-ray tube where the image typically has dimensions measured in terms of more than an inch. Corresponding to such a high degree of magnification, changes in the character of the surface under study may be readily inspected as they appear in much larger form in the reproduced image. Thus, a detail on the object surface having a dimension on the order of only 1 micron, and completely undiscernible by the naked eye, may be so magnified as to appear in the image on a conventional cathode-ray tube image screen sufficiently large to be readily observable by the otherwise still-unaided human eye. For example, a detail which actually is only about one twenty-five-thousandths of an inch in size may be enlarged by such a system so as to appear in the re-created image with a size of between one-fifth and one-half inch that is easily observable.

The described image amplification or microscopic system does not of itself place any limitation upon the ultimate resolution that is obtainable. Consequently, the use of a deflection arrangement as above described to afford 400 resolvable spots in the image raster developed upon the surface under study is compatible with the use of conventional television receiver approaches in the image reproduction; the typical resolution of cathode-ray tubes commonly employed in that service also is approximately 400. Moreover, there is no degradation of resolution in the translation of the image from the surface under study into the reproduced image so long as the processing circuits have the bandwidths normally employed in conventional television receiver equipment.

The system of FIG. 1 thus constitutes a flying spot laser microscope in which detector 26 develops a video signal that is representative of the intensity of the light transmitted back from surface 18. The developed video signal is fed through processing circuits 27, described more particularly hereafter, to the video channel feeding the cathode-ray tube in image reproducer 24 so as correspondingly to control the intensity of the picture elements it reproduces as its image raster is scanned. As described hereinbefore, the development of the scanning raster upon surface 18 is synchronized with the re-created picture raster on image reproducer 24 by virtue of the synchronization of the deflection signals from source 25 with the scanning signals in image reproducer 24. Consequently, the picture observed upon the image screen of reproducer 24 is a greatly magnified replica of the very small area over which the light beam is scanned upon surface 18.

The ultimate resolution or detail obtainable is a function of the spot size of the laser beam but the achievement of a desired minimal spot size is accompanied by a decrease in the depth of field so that, without more, placement of object 17 precisely within image plane 16 becomes imperative to keep the image raster defined upon surface 18 in sharp focus. In the recorder-reproducer environment, a similar need for tight tolerance occurs both when initially recording the image and subsequently when reproducing it.

Figure 2:
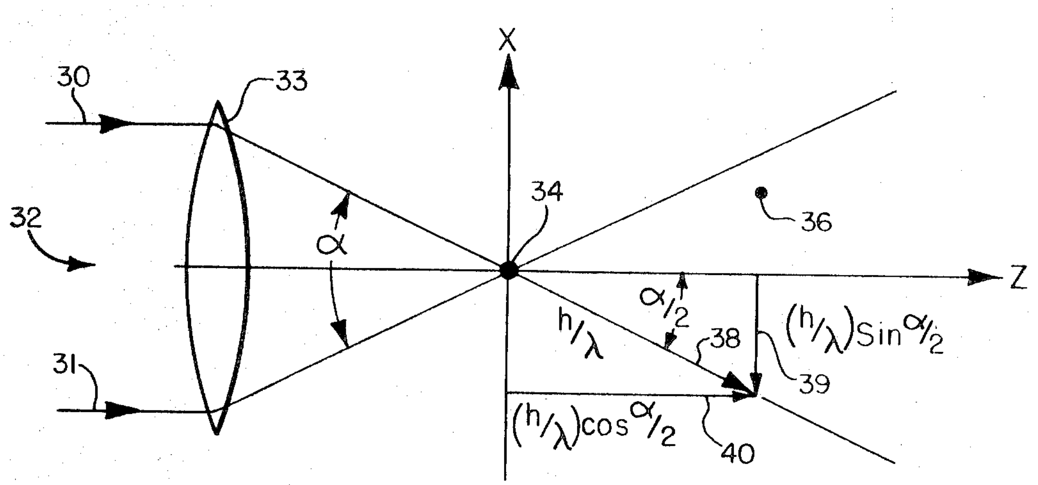
FIG. 2 is a diagram depicting a focused beam of light.

The relationships involved in maintaining a sharp focus condition may be understood further by an examination of FIG. 2. Lines 30 and 31 together represent the envelope of a solid light beam 32 of circular cross section focused by a convergent lens 33 at a convergence angle or angular aperture $\alpha$ to a point 34 beyond which the envelope again diverges. While the envelope is depicted by lines that cross at point 34, in actual practice the beam is only restricted to a narrow waist or region of circular cross section having a theoretical minimum diameter of one-half light wavelength. As viewed in a plane transverse to the direction Z of the beam and disposed along the axis X through the theoretical point 34 of focus, a spot is formed which is of finite size. As mentioned, that spot will have a sharply defined outline only in the plane of axis X or when viewed in parallel planes displayed a short distance in a direction away therefrom that, nevertheless, remain within the depth of focus. Stated differently, a sharp focus exists only in those planes that are within the resolution of the focal system in the depth directions. The smaller the spot size, the shorter the depth of focus or depth resolution.

Light customarily is represented as being composed of photons of energy, and a beam of light for present purposes may be thought of as being composed of an enormous quantity of such photons in the form of invisible "particles" bundled together and all traveling generally in the direction Z. On traversing lens 33, the photons are squeezed together as if forced into a funnel having a maximum construction at focal plane X. Once past that constriction, the photons spread apart, like water from a spray nozzle, so as to diverge. Moreover, it is not possible accurately to determine at the same time the position and momentum of any photon within the beam. The accuracy with which the position of a particular photon can be known is inversely proportional to the accuracy with which its momentum is known. For a large number of photons, as here, this implies that near the focus the light will not be concentrated in a point but rather spread out to an extent determined by the effective spread of photon momenta. In terms of quantum mechanics wherein ΔP and ΔL, respectively, are the uncertainties in the momentum and position of a photon along a certain direction, the relationship in this case is expressed:

$$\Delta P \Delta L = h,$$

where $h$ is Planck's constant. The momentum itself is equal to $h/\lambda$, where λ is the wavelength of the light.

Analyzing FIG. 2 as a momentum diagram, vector 38 represents the possible momentum of a photon near focal point 34 of magnitude $h/\lambda$ in a direction forming an angle $\alpha/2$ below the Z axis. Correspondingly, there is a component of momentum in the X direction of magnitude $(h/\lambda)\sin(\alpha/2)$, as indicated by vector 39, and a momentum component in the Z direction of magnitude $(h/\lambda)\cos(\alpha/2)$, as indicated by vector 40. Recalling that a particular momentum vector may be directed anywhere within the indicated envelope, it can thus be seen that its momentum in the X-direction may be anywhere between a positive and a negative value of the magnitude of vector 39 corresponding to a maximum variation of the momentum direction by an angle α. Thus, this variation $\Delta P_x$ in its X-component of momentum may be expressed:

$$\Delta P_x = \frac{2h}{\lambda}\sin(\alpha/2) \quad (2)$$

From the uncertainty relation of equation (1), the uncertainty Δx in position in the X direction thus becomes:

$$\Delta x = h/\Delta P_x = \frac{\lambda/2}{\sin(\alpha/2)} \quad (3)$$

This uncertainty in X-position, the quantity Δx, is the spot size at focal region 34. Thus, the reason for the existence of a finite spot size stems directly from the uncertainties in momentum and position of the individual photons. It may also be noted in passing that the value sin (α/2) in equation (3) is often referred to as the numerical aperture of the optical lens system.

Again referring to FIG. 2, it can also be seen that the uncertainty in momentum in the Z direction varies between the respective magnitudes of vectors 38 and 40. This may be expressed:

$$\Delta P_z = \frac{h}{\lambda}[1 \cos(\alpha/2)] \quad (4)$$

Again from equation (1), the uncertainty Δz in the Z direction is given by the relationship:

$$\Delta z = h/\Delta P_z = \frac{\lambda}{1-\cos(\alpha/2} \quad (5)$$

The value Δz is the depth of focus.

By algebraic manipulation of the trigonometric relationships expressed, it can be shown that the depth of focus Δz and the spot size Δx are related in accordance with the expression:

$$\left(1-\frac{\lambda}{\Delta z}\right)^2+\left(\frac{\lambda}{2\Delta x}\right)^2=1 \quad (6)$$

For typical small angles of convergence, where α/2 is much less than 1 radian, equation (6) reduces to:

$$\frac{\Delta z}{\lambda}=8\left(\frac{\Delta x}{\lambda}\right)^2 \quad (7)$$

Examination of equation (5) quickly reveals that the depth of field Δz becomes very small as the convergence angle α is increased to achieve high resolution in accordance with equation (3). For example, when α/2 is equal to 90°, the spot size Δx is λ/2 and the depth of field Δz is λ; these are the conditions for theoretical maximum convergence and, hence, minimum spot size. For a lesser convergence angle such that (α/2) is 30°, the spot size Δx has a value of λ and the depth of field Δz is increased to 7.4λ. Thus, the depth of field may be increased by reducing the value of the convergence angle, but this is achieved only at the expense of an increase in the size of the spot with consequent degradation in terms of resolution.

Figure 3:
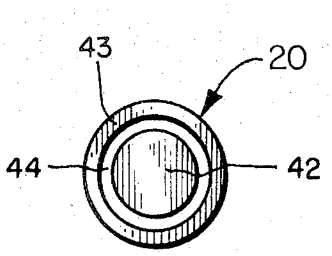
FIG. 3 is a front elevational view of a component included in the system of FIG. 1.
Figure 4:
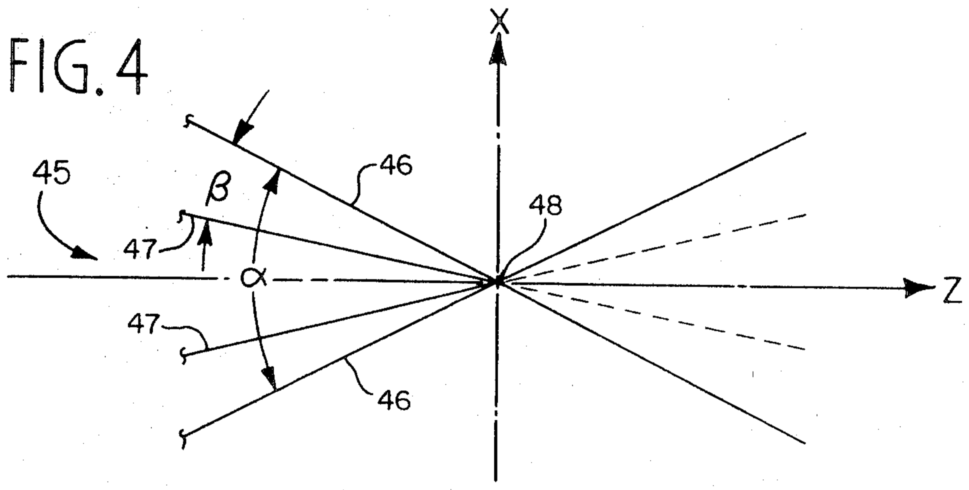
FIG. 4 is a diagram similar to FIG. 2 but in which the shape of the light beam is modified.

To enable such an increase in the depth of field without at the same time encountering an undesired increase in the spot size, the system of FIG. 1 is arranged so that the beam focused upon surface 18 is in the form of a hollow cone. To that end, the system desirably may include a device for transforming a solid beam obtained from laser 10 into one of doughnut or annular cross section; such devices are discussed, for example, by Peters and Ledger in Paper WF17 presented in the Proceedings of the 1968 Spring Meeting of the Optical Society. In a perhaps less efficient form, but one which is exceedingly simple and more clearly illustrative, an annular ring is disposed in the system of FIG. 1 as the final aperture. That is, as shown in FIG. 3 eyepiece 20 is coated upon its side facing surface 18 with a central annular disc 42 symmetrically around which is spaced an annulus 43, both disc 42 and annular 43 being composed of a light-opaque material. Together they define an annular ring 44 transmissive of the light emerging from eye piece 20. That light is converged into a hollow cone 45 as shown in FIG. 4. In this example, the cone is defined by an outer envelope 46 having an external convergence angle α and an inner envelope 47 which together with outer envelope 46 defines an angular wall thickness β. As in FIG. 2, the beam is converged to a focal region 48 in the X-plane at which lies the theoretical apex of the cone of light.

The same as in FIG. 2, around the focal region the photons exhibit an uncertainty in correlated terms of position and momentum. Moreover, the possible diversity in the X-component of momentum $\Delta P_x$ is the same in FIG. 4 as it was in FIG. 2. Thus, the component of momentum $\Delta P_x$ in the X direction is again expressed by equation (2), and the spot size Δx is also again expressed by equation (3).

However, the spread or uncertainty in component of momentum in the Z direction is changed because of the hollow nature of the focused beam. In terms of graphical analysis, the momentum vectors are now constrained to lie somewhere between or on the lines 46 and 47 as extended beyond the focal point. While this does not change the spread in the momentum in the X direction in FIG. 4 that would correspond to vector 39 in FIG. 2, it does change the range of variation in the vector that would be equivalent to vector 40 in FIG. 2. That is, in the manner in which the change in vector 40 was analyzed with respect to FIG. 2, it may be shown that the uncertainty in the Z component of momentum $\Delta P_z$ is expressed by the relationship:

$$\Delta Pz = \frac{h}{\lambda}[\cos(\alpha/2-\beta)-\cos(\alpha/2)] \quad (8)$$

Equation (8) may be simplified to read:

$$\Delta P_z = 2\frac{h}{\lambda}\sin(\beta/2)\sin\frac{\alpha-\beta}{2} \quad (9)$$

From equation (1), the uncertainty $\Delta_z$ in the Z direction, or the depth of focus, is expressed:

$$\Delta z = \frac{\lambda/2}{\sin(\beta/2)\sin\left(\frac{\alpha-\beta}{2}\right)} \quad (10)$$

An examination of equation (10) reveals that the depth of field Δz can be given a desired value, larger than that attained under the condition in which β=(α/2), without in any way affecting the resolution that corresponds to the spot size given by equation (3). For a comparison of the results obtained with the light beams of FIGS. 2 and 4, it is of interest to consider the simplified case when $\beta/2$ is much less than $\alpha/2$, defining what may be termed a very thin cone of incident rays. In that case, it can be shown that:

$$\Delta z=\frac{\Delta x}{\sin(\beta/2)} \qquad (11)$$

Again for the theoretical maximum situation where $\alpha/2$ is 90°, the spot size $\Delta x$ is $\lambda/2$. By utilizing a wall angle $\beta$ of one-tenth radian, or approximately 60°, equation 11 yields a value for the depth of field $\Delta z$ of 10 wavelengths. This will be observed to result in an increase in the depth of a field by a factor of ten as compared with the use of the solid beam in FIG. 2. Still smaller valves of the wall angle $\beta$ lead to yet bigger improvement of the depth of field. At the same time, this improvement in depth of field is obtained without any affect upon spot size as a result of which the system continues to exhibit a high resolution.

Figure 5:
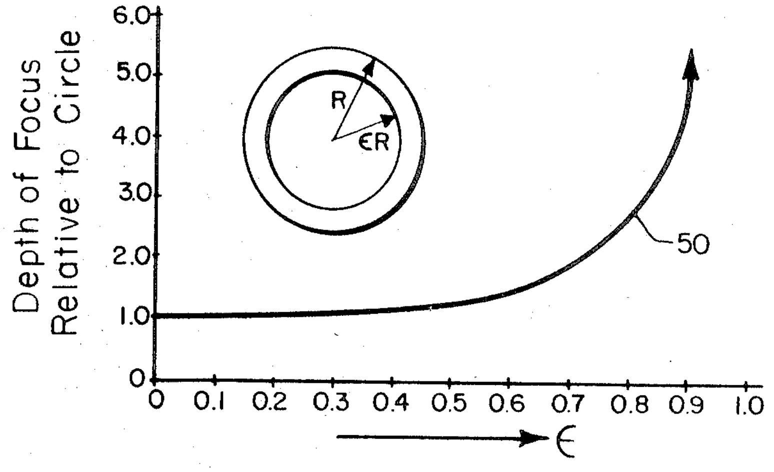
FIG. 5 is a plot depicting change in depth of focus as the wall thickness of a hollow light beam is varied.

For the usual case in which the $f$-number of the optical system is comparatively large (has a small aperture), it can be shown that the ratio of the depth of focus $\Delta za$ for the annular or hollow beam to the depth of focus $\Delta zsc$ of a solid-circular beam is as follows:

$$\frac{\Delta za}{\Delta zsc}=\frac{1}{(1-\epsilon^2)} \qquad (12)$$

where $\epsilon$ is the fraction that the inner-wall radius is of the outer-wall radius of the annular beam. This relationship is shown in FIG. 5 wherein the value of $\epsilon$ is plotted along the abscissa and the depth of focus in the annular beam relative to that of a solid circle is plotted along the ordinate. As exhibited by curve 50, the ratio, of course, approaches unity as the value of $\epsilon$ becomes smaller and the annulus, therefore, approaches the condition of being a solid circle. On the other hand, the depth of focus, relative to that of a solid circle, becomes very large, approaching infinity, as the wall thickness of the annulus becomes very thin. The small diagram above curve 50 on the plot illustrates the relative radii of the inner and outer walls with the outer-wall radius being denominated R, so that the inner-wall radius then is $\epsilon$R.

Unfortunately, the mere use of the hollow beam of light focused upon surface 18 in FIG. 1 results in a severe reduction in image contrast in both the horizontal and vertical directions of scan. In recording an image with a hollow beam as in the system of the aforesaid prior application, this loss of contrast appears in the image recorded upon the film strip and, in turn, appears also in the reproduced image. In the microscope system of FIG. 1, or in an image reproduction system, use of the focused hollow beam for reproducing the image similarly results in loss of contrast in the ultimate image created by reproducer 24. For a monochrome system, of course, this contrast loss is readily observed as a lack of definition of different shades of gray as well as in a failure to develop complete black or complete white, or both.

When the beam of light focused upon the image plane is a solid cone, as in FIG. 2, the resulting spot is said to be diffraction limited. However, it actually results in the formation of an intense central area of circular shape. This is the light spot of interest, but it also is surrounded by spaced annular rings each representing light of successively alternate phases. The combination of the rings and the central spot is termed a diffraction pattern and the central spot is known as the Airy disc. For the case of an incident solid cone of light upon the image plane, the diffraction limited pattern is such that the central spot or area is of a high intensity while the surrounding rings are of comparatively minor intensity. Consequently, those surrounding rings in a practical application create little interference at adjacent spot or picture element positions.

However, when the thin hollow cone of light represented in FIG. 4 is incident upon the image plane, the resulting diffraction pattern is one in which the surrounding rings are significantly more pronounced in intensity which produces a type of interference between adjacent spots or picture elements that results in the loss of contrast at high spatial frequencies. Consequently, it becomes very difficult to view fine details even though the image resolution, as such, remains the same as before.

Figure 6:
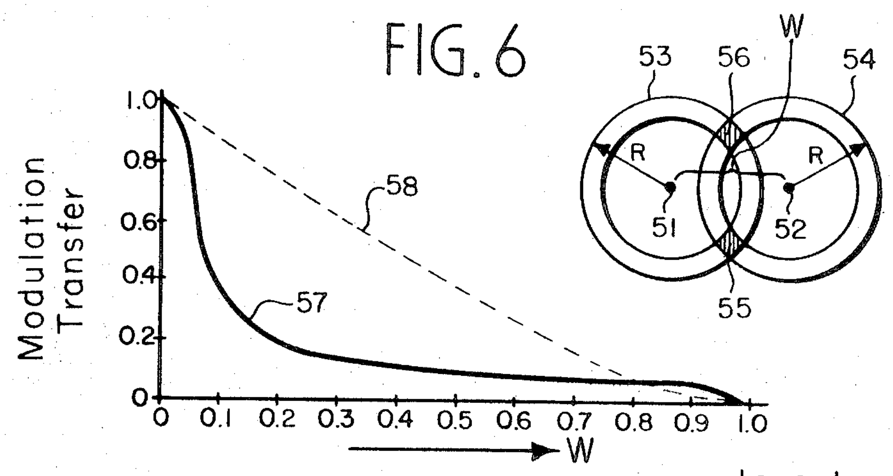
FIG. 6 is a plot of the modulation transfer functions of light beams having two different shapes.

Recalling the checkerboard example above, the small size of the light spot on the image plane results in the ability to discern detail. The capability of resolving that detail is still preserved when utilizing the hollow beam by focusing it to intercept but a minute area of the image plane. Consequently, the theoretically discernible distance between individual picture elements in a line trace is the same as the diameter of the focused spot which in this case is the diameter of the Airy disc in the diffraction pattern. Nevertheless, the higher-order or surrounding rings in the diffraction patterns at successive picture element positions overlap with a resulting interference that produces the contrast loss. It may be shown that the relative obtainable contrast between neighboring image elements, of size $X_o$, corresponding to a spatial frequency of $1/2X_o$ cycles per unit length, is given by the overlap of two aperture functions when displaced by a relative distance $W=1/2F(\lambda/Xo)$, where $F$ is the focal length of the lens used in the system. This is illustrated in FIG. 6 wherein the distance $W$ is plotted along the abscissa which is normalized to a value of 1.0 when equal to twice the outer radius R of the beam. The ordinate represents the value of the relative contrast which is usually called the modulation transfer.

As can be observed from inspection of FIG. 6, when the value of $W$ is 1.0 (2R) or greater, there is no overlap of the hollow-beam aperture functions 53 and 54 at two successive picture element positions 51 and 52 so that the relative contrast for spatial frequencies greater than $2R/F\lambda$ is zero as shown by curve 57 which represents the modulation transfer function of a hollow beam. At the other extreme, where $W$ becomes zero corresponding to zero spatial frequency, the contrast (in arbitrary units) is unity. Between these two extremes, the available contrast as shown by curve 57 corresponds to the proportion of the cross-sectional area of one aperture function that overlaps the other as shown by areas 55 and 56. The particular shape of curve 57 is a function of the value of $\epsilon$ (see diagram on FIG. 5) which, in turn, is a function of the annular wall thickness; as that thickness becomes larger so that the cross section of the beam approaches a solid circle, the shape of curve 57 approaches that of dashed curve 58 which depicts the modulation transfer function of a solid circle.

It is for the purpose of enhancing image contrast that the system of FIG. 1 includes processing circuits 27 which permit compensation of the effects just described that otherwise would cause loss of contrast in the reproduced image. The effect of these circuits may be viewed as compensating for the departure of curve 57 from curve 58 in both the horizontal and vertical scan directions. Circuits 27 enhance the contrast by electronically processing the video signals developed by detector 26 and, as will be seen, this is accomplished in a manner that permits adjustment of the degree of compensation effected so as to permit obtaining a contrast value of any desired amount.

Figure 7:
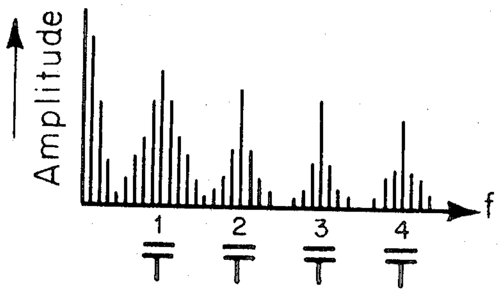
FIG. 7 is a plot of the distribution of informational content in a video signal representative of a scanned image.

As well understood in the art of television transmission, video signals representative of a scanned image contain information which is distributed over a frequency spectrum in groups of frequencies bunched about successive integral multiples of the horizontal scanning frequency. This is represented in FIG. 7 wherein video signal frequency is plotted along the abscissa and signal amplitude along the ordinate. In addition to the direct current component at zero frequency and the informational content carried thereon, the information appears in groups of frequencies displaced to either side of each successive harmonic of the line scanning frequency. These harmonics are successively indicated by the values 1/T, 2/T, 3/T and 4/T where T is the trace time or the time it takes for the scanning beam to complete one deflection or sweep in a given direction. With conventional television standards, the horizontal deflection frequency or repetition rate is 15,750 Hertz and the trace time T is 63.5 microseconds. Further analysis of the frequency spectrum of such a television signal is found in "Television—The Scanning Process" by Pierre Mertz which appeared at pages 529–137 of the Oct. 1941 issue of the Proceedings of the I.R.E.

The aforementioned degradation of contrast that arises by reason of the use of the hollow beam appears as a modification of the video signal content in each of the groups of signal information bunched about the scanning-harmonic frequencies. In order to compensate for that modification in the vertical spatial frequencies, processing circuits 27 of FIG. 1 include a filter presenting a high pass frequency-response characteristic to the video-signal content at and around each of those line harmonics. MOreover, for more complete compensation, that high pass filter characteristic at each harmonic has a shape which is at least generally the reciprocal of the modulation transfer characteristic attendant to the use of the hollow beam and as represented by curve 57 in FIG. 6. In general, then, the filter presents a frequency-response characterized by increasing signal transmission with departure in frequency from the frequency of each of the line harmonics. A filter which attenuates or passes a series of frequencies or frequency-bands spaced apart by a succession of frequency differences is commonly termed a comb filter.

As such, a variety of comb filters are known in the art, particular examples of which are shown and described in an article titled "An Analysis of a Type of Comb Filter" by A. G. J. MacFarlane which appeared at pages 39–52, Paper Number 3121E published in Jan. 1963 by the Institution of Electrical Engineers. A comb-filter system particularly useful in processing circuits 27 of FIG. 1 is included in the arrangement shown in FIG. 8 wherein a portion of the video signal developed by photodetector 26 is fed through an adder 60, a delay line 61 and a subtractor 62. Another portion of the incoming video signal is fed directly to a second input of subtractor 62 so that the output signal from the latter is the difference between its two input signals. Part of the output signal from delay line 61 also is fed back to adder 60 through an amplifier 63 as a result of which the total signal fed to delay line 61 is the sum of a portion of the initial video signal developed by photodetector 26 and the delayed feedback signal delivered by amplifier 63.

Figure 9:
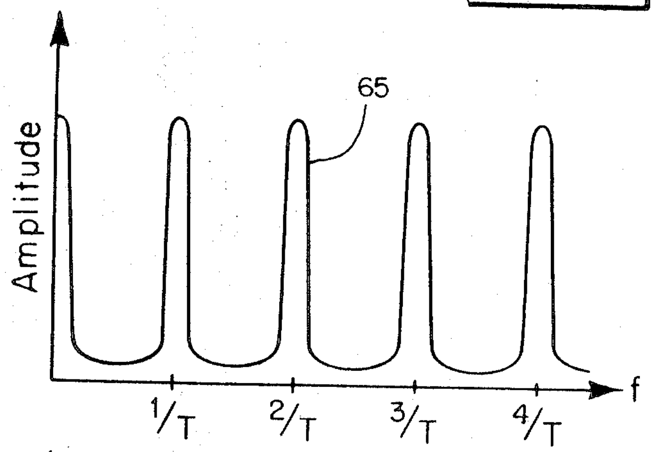
FIGS. 9 and 10 are plots of the frequency-response characteristics of different parts of the apparatus shown in FIG. 8.

By themselves, adder 60, delay line 61 and amplifier 63 constitute a known comb filter which exhibits a frequency response characteristic of the kind represented by the curve 65 in FIG. 9. By assigning a delay time T to delay line 61, the filter response exhibits a succession of signal-transmission peaks falling successively at respective frequencies corresponding to each integral multiple of the reciprocal of the delay time. As employed herein, the delay time T of delay line 61 is the same as the deflection period or trace time T discussed in connection with FIG. 7. Consequently, the successive response peaks in FIG. 9 fall at the frequencies corresponding to the bunches of video signal content arriving from photodetector 26. By adjusting the gain B of amplifier 63, the sharpness of the response peaks in curve 65 may be varied. While gain B is always at least slightly less than unity so as to avoid positive regeneration, the closer its value is to unity, the more narrow and sharp will be those response peaks.

Curve 65 represents the frequency response characteristic which, during operation, is presented to the video signals traversing the path through delay line 61. The effect of subtractor 62 is to essentially invert curve 65 so that the overall frequency-response as viewed at the output of subtractor 62 is of the kind represented by curve 66 in FIG. 10. Thus, the characteristic exhibits a series of minima at each of the deflector-rate harmonic frequencies with the signal-transmission level increasing with departure to either side of each of those harmonic frequencies. Curve 66, therefore, represents the frequency response to which the video signals from photodetector 26 are subjected in their transmission through subtractor 62.

Figure 10:
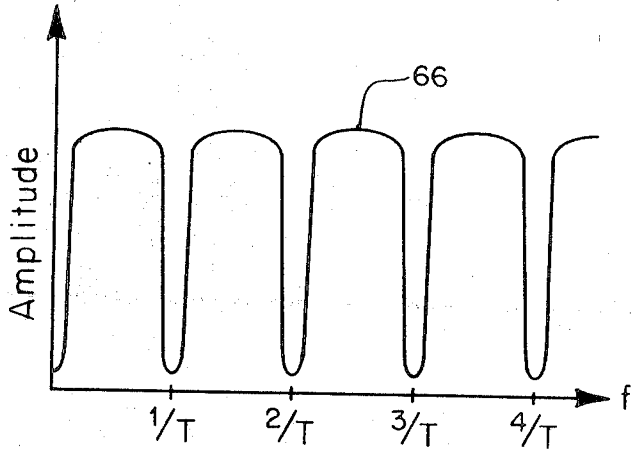

While it may be difficult to visualize in FIG. 10, because of the compression of scale along the abscissa as compared with FIG. 6, the shape of the portions of curve 66 immediately on either side of each scanning-harmonic frequency is ideally at least approximately the effective reciprocal of curve 57 in FIG. 6. That is, curve 66 is at a minimum at the harmonic frequency in accordance with maximum value of curve 57 for a condition of zero spacing or spatial frequency between successive picture elements. Curve 66 then rises rapidly from each harmonic frequency, in correspondence with the rapid drop of curve 57, until finally curve 66 becomes somewhat flat-topped between the harmonic frequencies which is a condition reciprocal to the somewhat flat-bottomed shape of curve 57. Such reciprocity between the two curves is sought because the differences in frequency in the video signals as represented in FIG. 7, and as filtered in accordance with curve 66 of FIG. 10, corresponds to differences in the spatial frequencies of the successive picture elements distributed across the image plane. That is, the distance W in the diagram on the plot of FIG. 6 defines the spatial periodicity of successive image elements, and its inverse, 1/W, represents what may be termed the vertical spatial frequency. It is these spatial frequencies within the optical portions of the systems that are represented by the signal frequencies in the electrical portions of the system.

Figure 11:
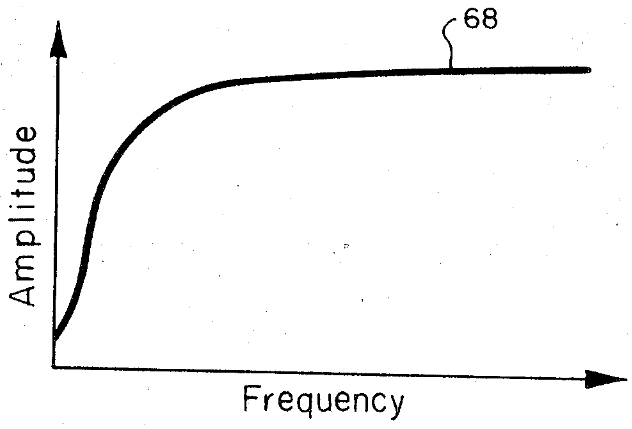
FIG. 11 is a plot of the frequency-response characteristic of another part of the FIG. 8 apparatus.
Figure 12:
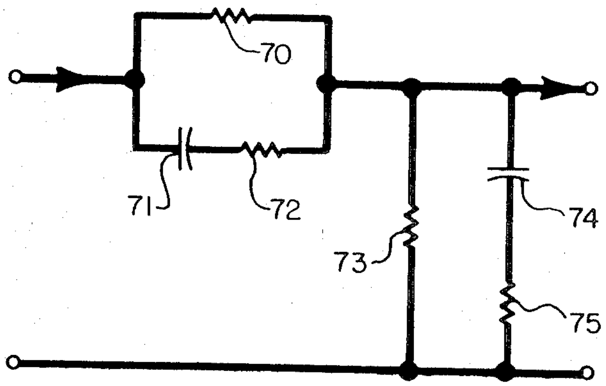
FIG. 12 is a schematic diagram of one element in the apparatus of FIG. 8.

The comb filter just discussed equalizes the response for vertically directed spatial frequencies. In order to also equalize horizontally directed spatial frequencies appropriate compensation is included in the system of FIG. 8. To this end, the signal output from subtractor 62 is fed through a high pass filter 64 before being applied to image reproducer 24. Filter 64 exhibits a simple high pass frequency-response characteristic as illustrated by curve 68 of FIG. 11 in which frequency is plotted along the abscissa and amplitude along the ordinate. Of course, such high pass filters are well known in practice. A conventional L-section filter of that type is shown in FIG. 12, wherein resistor 70 in parallel with the series combination of capacitor 71 and resistor 72 form the series arm and resistor 73 in parallel with the series combination of capacitor 74 and resistor 75 form the shunt arm.

Figure 13:
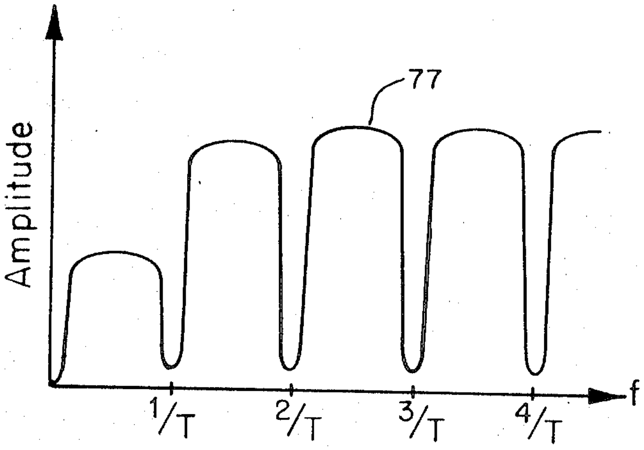
FIG. 13 is a plot of the frequency-response characteristic of the overall apparatus shown in FIG. 8.

The effect of including high pass filter 64 is to modify response curve 66 of FIG. 10 so that it has the pattern of curve 77 in FIG. 13. Analogously to the shaping of curve 66 in FIG. 10, maximum compensation is obtained by sloping curve 68 in FIG. 11 so that it is the reciprocal of curve 57 in FIG. 6.

Having explained in detail the principles involved as applied to image reproducing, it is now appropriate to recall that the contrast-reduction compensation may be needed to correct such loss that may occur during either or both of recording and reproducing by use of the hollow beam. In the case of either or both such sources of contrast reduction, they may alternatively be compensated in a fully analogous manner by prefiltering a video signal being recorded. To this end, the recording embodiment of the aforementioned copending application is modified to include processing circuits 27 in the signal path feeding the light modulator that is disposed in beam path 11 between laser 10 and deflector 12. Since the operation of circuits 27 is the same in both cases, it is unnecessary to dwell further upon this alternative. In either case, an object acts upon the scanned hollow beam and such action results in degradation of image contrast. Somewhere in the video signal path, the filtering compensation is inserted to compensate that degradation.

Figure 8:
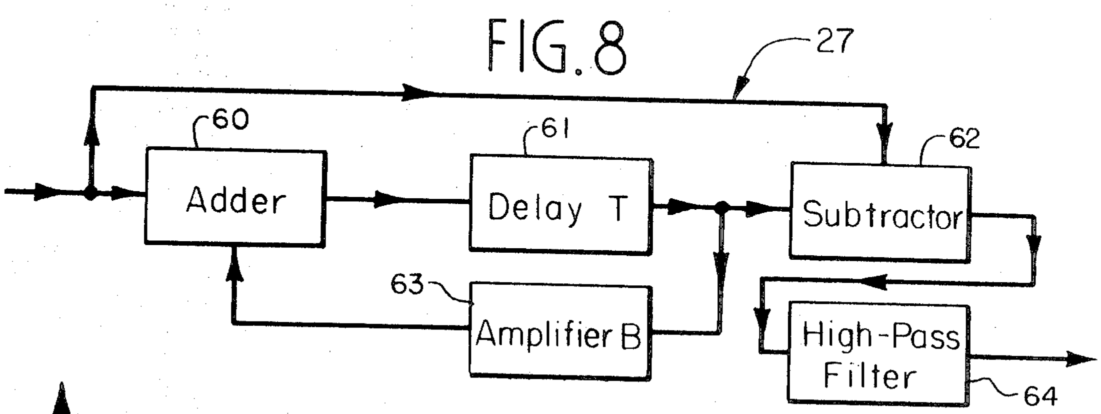
FIG. 8 is a block diagram of another portion of the arrangement in the system of FIG. 1.

As has been described, processing circuits 27 take the form of the filter system of FIG. 8 and, during operation, the video signals are subjected to a frequency response characteristic like that of FIG. 13 in their transmission to image reproducer 24 or to a light beam modulator. The result is to restore the image contrast which is lost in the optical portion of the system by virtue of using the focused hollow light beam. At the same time, the resolution capability of the overall imaging scheme is retained and the tremendous improvement in depth of field, occasioned by use of the focused hollow beam, is advantageously utilized. In consequence of the latter, the tolerance in placement of object surface 18 relative to image plane 16 is considerably relaxed.

Adjustment of the contrast in the ultimate image is obtained by controlling the gain of amplifier 63 and/or a gain-adjusting element in filter 64. Further variation of contrast in the ultimate image may be obtained also by controlling the amplitude of either of the signals which are fed to subtractor 62 or by adjusting additional wave-shaping elements in the filters so as to vary the different relative proportions and contours of its overall frequency-response characteristic.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. Electro-optical apparatus comprising:

means for producing a hollow beam of substantially monochromatic light focused in an image plane and for deflecting said beam to scan an image area in said plane;

means responsive to the scanning of said beam over said area for translating an image of an object in said area comprising;

means for developing video signals representing said object;

and signal processing means for modifying said video signals to compensate degradation in image contrast attributable to scanning with a hollow beam and related thereto as a function of the ratio between the inner and outer radii of the walls of said beam.

2. Apparatus as defined in claim 1 in which said focused light defines a cone the apex of which is at least in the vicinity of the said plane, the external convergence angle of which is of a given size and the internal convergence angle of which is but a fraction of a radian less than said given size.

3. Apparatus as defined in claim 1 in which said signal-processing means is coupled between a detector which responds to light eventuating from said image area to develop said video signals and an image reproducer which responds to said video signals to reproduce an image of said object.

4. Apparatus as defined in claim 1 in which said signal-processing means includes a filter presenting a high pass frequency-response characteristic to the content of said video signals.

5. Apparatus as defined in claim 4 in which said focused hollow-beam exhibits a predetermined modulation transfer function and said frequency-response characteristic has a shape which at least generally is the reciprocal of said transfer function.

6. Apparatus as defined in claim 4 in which said beam is deflected in one direction repetitively at a given frequency, said video signals correspondingly contain information distributed over a frequency spectrum in groups of frequencies bunched about successive integral multiples of said given frequency and said filter presents a frequency-response characterized by increasing signal transmission with departure in frequency from the frequency of each of said integral multiples.

7. Apparatus as defined in claim 4 in which said signal-processing means includes a comb filter exhibiting response maxima separated by the frequency at which said beam is repetitively deflected in one direction.

8. Apparatus as defined in claim 7 in which said filter responds to a portion of said video signals and produces filtered signals and said signal-processing means further includes a system for effectively inverting said filtered signals.

9. Apparatus as defined in claim 8 in which said system includes means for subtracting said filtered signals from another portion of said video signals.

10. Apparatus as defined in claim 4 in which said signal-processing means includes a filter system exhibiting minima at the harmonics of the frequency at which said beam is repetitively deflected in one direction and exhibiting response characteristics above and below each of said minima that at least approximate reciprocals of the modulation transfer function of said focused hollow beam.

11. Apparatus as defined in claim 6 in which said beam also is deflected repetitively in another direction lateral to said one direction and at a frequency substantially less than said given frequency and said signal-processing means further includes additional means constituting another filter presenting a high pass frequency-response characteristic to the content of said video signals.

12. Apparatus as defined in claim 11 in which said other filter substantially attenuates said video signals only in comparatively lower-frequency ones of said groups of frequencies.